(12) United States Patent
Garoff et al.

(10) Patent No.: US 6,303,532 B1
(45) Date of Patent: Oct. 16, 2001

(54) OLEFIN POLYMERIZATION CATALYST CONTAINING A TRANSESTERIFICATION PRODUCT OF A LOWER ALCOHOL AND A PHTHALIC ACID ESTER

(75) Inventors: Thomas Garoff, Helsinki; Timo Leinonen, Tölkkinen; Eero Iiskola, Porvoo, all of (FI)

(73) Assignee: Borealis Technology Oy, Lyngby (DK)

( * ) Notice: Subject to any disclaimer, the term of this patent is extended or adjusted under 35 U.S.C. 154(b) by 0 days.

(21) Appl. No.: 08/425,258

(22) Filed: Apr. 18, 1995

Related U.S. Application Data

(63) Continuation of application No. 08/140,090, filed as application No. PCT/FI92/00081 on Mar. 23, 1992, now abandoned.

(30) Foreign Application Priority Data

May 9, 1991 (FI) ............................................ 912262

(51) Int. Cl.$^7$ ...................................................... B01J 31/04
(52) U.S. Cl. ........................... 502/127; 502/107; 502/102; 526/348; 526/351; 526/125.3; 526/125.6
(58) Field of Search .................................... 526/348, 331, 526/125.3, 125.6; 502/107, 127, 102

(56) References Cited

U.S. PATENT DOCUMENTS

| | | | |
|---|---|---|---|
| 4,442,276 | * | 4/1984 | Kashiwa et al. ................... 526/124.8 |
| 4,761,461 | * | 8/1988 | Jaggard et al. ...................... 526/125 |
| 4,829,034 | * | 5/1989 | Iiskolan et al. .......................... 302/9 |
| 5,234,879 | * | 8/1993 | Garoff et al. ........................ 502/107 |
| 5,360,776 | * | 11/1994 | Iiskola et al. ........................ 502/111 |

FOREIGN PATENT DOCUMENTS

| | | |
|---|---|---|
| 0160256 | 2/1991 | (DK) . |
| 0226003 | 6/1987 | (EP) . |
| 0488537 | 6/1992 | (EP) . |
| 8707620 | 12/1987 | (WO) . |

OTHER PUBLICATIONS

"Journal of Polymer Science", vol. 28, Chieu, JCW et al, pp. 273–284.
International Search Report dated Aug. 19, 1992 of PCT application. PCT/FI92/00081.
International Preliminary Exam Report dated May 11, 1993 of PCT Int'l. Application.
Journal of Polymer Science, vol. 28, Chien, J C W et al., pp. 273–284.

* cited by examiner

*Primary Examiner*—David W. Wu
*Assistant Examiner*—Ling-Siu Choi
(74) *Attorney, Agent, or Firm*—Birch, Stewart, Kolasch & Birch, LLP

(57) ABSTRACT

In the invention a catalyst composition intended for the polymerization of olefins has been provided, which has been prepared by bringing together magnesium chloride, a lower alcohol, a titanium compound and an ester of phthalic acid. The procatalyst composition is active and stereospecific and it simultaneously has a titanium and phthalic acid content as low as possible. These good properties have been achieved by carrying out a transesterification between the lower alcohol and the ester of the phthalic acid, whereby the alkoxy group of the phthalic acid comprises at least five carbon atoms.

36 Claims, 11 Drawing Sheets

OLEFIN POLYMERIZATION CATALYST CONTAINING A TRANSESTERIFICATION PRODUCT OF A LOWER ALCOHOL AND A PHTHALIC ACID ESTER

This is a continuation of application Ser. No. 08/140,090, filed Nov. 1, 1993, now abandoned, which is a 371 of PCT/FI92/00081 filed Mar. 23, 1992.

FIELD OF THE INVENTION

The invention relates to a catalyst composition intended for the polymerization of olefins, said composition prepared by combining $MgCl_2$, a lower alcohol, a titanium product and an ester of phthalic acid. The invention also relates to the use of said catalyst composition for the polymerization of propylene.

BACKGROUND OF THE INVENTION

Olefins, especially α-olefins, are often polymerized by the aid of a catalyst composition, in which the catalyst is formed from a compound of a transition metal of the Groups IV–VI of the periodic table and a compound of a metal of the Groups I–III of the periodic table and activating it by reduction, i.e. the co-catalyst. The so-called Ziegler-Natta-catalyst has been further developed by using as the support for the transition metal an inert carrier, to which the transition metal compound is layered to improve the activity of the catalyst when it is catalyzing the polymerization reaction.

Yet, influenced by this catalyst composition, the asymmetrical olefin monomers often polymerize to various kinds of stereoisomeric polymers to form mixtures of e.g. isotactic, atactic and syndiotactic polymers, from which the desirable stereoisomer must be separated by means of often troublesome washing and other stages. When mainly a polymer of a certain stereospecific form is desired, e.g. an isotactic polyolefin from an asymmetrical olefin monomer, the influence of the catalyst on the stereospecifity may be improved by adding a donor compound to the catalyst. Because of a certain steric structure, the donor compound contributes to the settling of the monomer molecule in a certain position in the catalyst particle at the end of the growing polymer molecule, thus giving the molecule chain of the polymer a certain stereoisomeric structure and making the polymer product obtained, dependent on the donor compound selected, more or less as desired. There are two possibilities to add a donor to the catalyst: 1) a so-called internal donor is added to the catalyst mixture of the transition metal compound and the carrier or 2) the donor is added to the mixture of the monomer and the catalyst component in the polymerization reactor only when the cocatalyst is added, whereby the donor is called an external donor. A donor compound can, of course, also be used in both stages, whereby the donor can be a similar or a different compound at the various stages.

To asymmetrical i.e. stereospecifically polymerizing monomers except ethylene in which all side groups of the two non-saturated carbon atoms are hydrogens, and the rare case, where all side groups are similar, e.g. tetramethyl ethylene. A certain stereospecific form is made desirable by the fact that the properties of the polymer obtained for a certain purpose are more favorable, e.g. the isotactic polyolefins crystallize more easily, their bulk density is greater, their mechanical properties are better; thus they are e.g. stronger, etc. The adhesiveness of the atactic form, i.e. the adhesion properties, are generally better than in the tactic forms and they are thus suitable e.g. for glue applications.

When polymerizing asymmetric olefin monomers, i.e. the groups attached to carbon atoms by non-saturated bonds being of different kind at least as far as one group is concerned, the catalyst can comprise a compound improving the stereospecifity of the catalyst, i.e. an electron donor, which, as a donor of an electron, easily can attach to the resting structure of the catalyst and due to its steric influence direct the monomer molecule, which is going to attach to the polymer chain, to a position where the polymer molecule produced is, in a way, stereospecific as to its structure. Among such donors are numerous organic compounds, including esters, carboxylic acids, alcohols, ketones, aldehydes, nitriles, amides, amines, organic phosphorus and silicon compounds, etc. These compounds also have other influences on the properties of the catalyst, e.g. the activity of the catalyst varies depending on the donor used. If the donor is an ester of carboxylic acid, the esters of aromatic acids, benzoates, phthalates, toluates, anisates, etc. are used with the most preferable being dialkyl phthalates.

Combinations of various donors are also known in the art. Thus, from the JP publications 59172507, 59206409, 59206415, 59206416, 59206424, 60262804, 61103910 and 61108614 is known a catalyst composition, which is prepared from $MgCl_2$, 2-ethylene hexyl alcohol, titanium tetrachloride, di-isobutyl phthalate and in some cases from phthalic acid anhydride.

The patent family comprising the publications DE 3,540,699, EP 226,003 and U.S. Pat. No. 4,761,461, discloses a catalyst composition, which has been obtained by bringing together $MgCl_2$, alcohol, such as ethanol, an ester of phthalic acid, such as di-isobutyl phthalate, and titanium tetrachloride in certain conditions. The ester of phthalic acid can be added either at the stage when $MgCl_2$ and ROH are reacting with each other, or at the latter stage when the reaction product of $MgCl_2$ and alcohol are reacted with titanium tetrachloride.

The high titanium content of the above-mentioned catalysts causes color problems in the polymers and the high phthalic acid content causes non-desirable aromatic residues in the polymers.

| | |
|---|---|
| Rate: | 10.0° C./min |
| Intergration | 334 mJ |
| Delta H: | 107.5 J/g |
| Peak: | 161.6° C. |
| | −1.2 W/g |
| Content: | 51.4% |
| Ref dH: | 209.0 J/g; |

Figure 20:
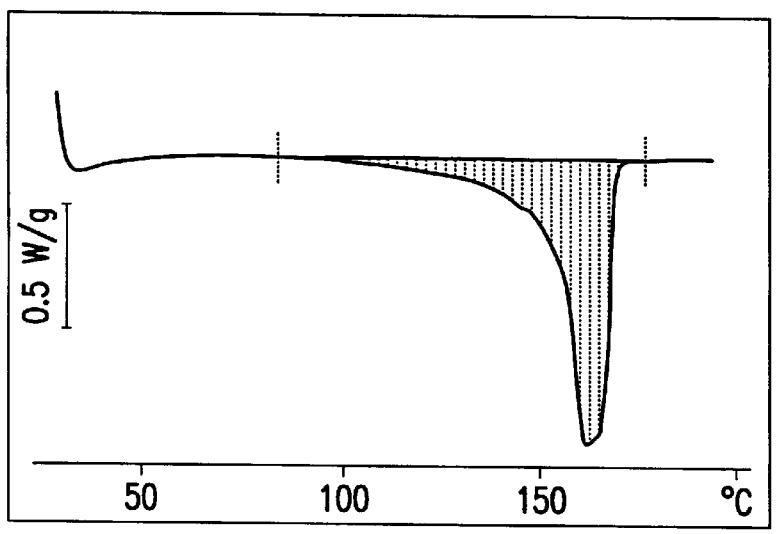

FIG. 20 shows a DSC curve of the polymer PP-C-8.

| | |
|---|---|
| Rate: | 10.0° C./min |
| Integration | 352 mJ |
| Delta H: | 108.3 J/g |
| Peak: | 161.6° C. |
| | −1.2 W/g |
| Content: | 51.8% |
| Ref dH: | 209.0 J/g; |

Figure 21:
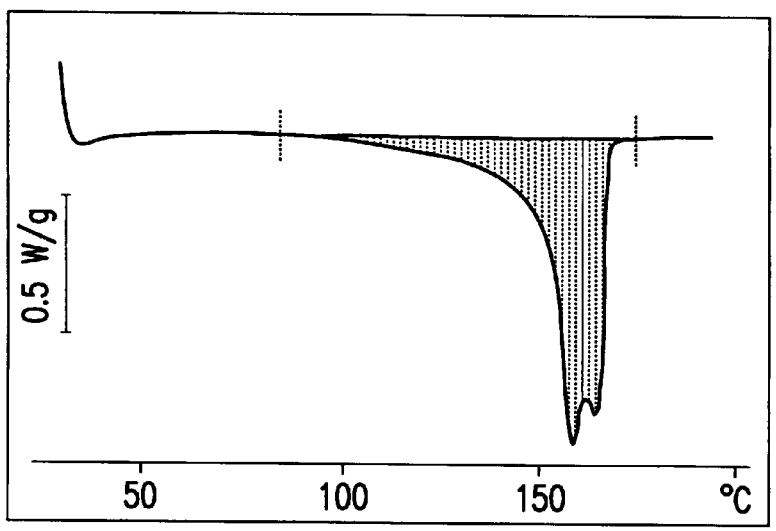

FIG. 21 shows a DSC curve of the polymer PP-C-13.

| | |
|---|---|
| Rate: | 10.0° C. |
| Integration | 247 mJ |
| Delta H: | 76.7 J/g |
| Peak: | 158.3° C. |
| | −1.1 W/g |
| Integration | 102 mJ |
| Delta H: | 31.7 J/g |
| Peak: | 164.3° C. |
| | −1.0 W/g |

Figure 22:
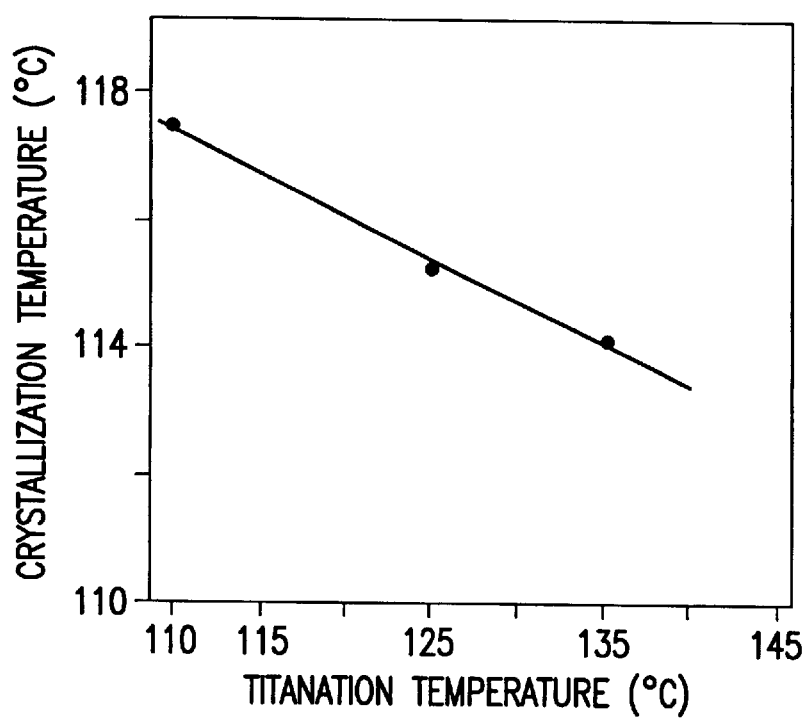
Figure 23:
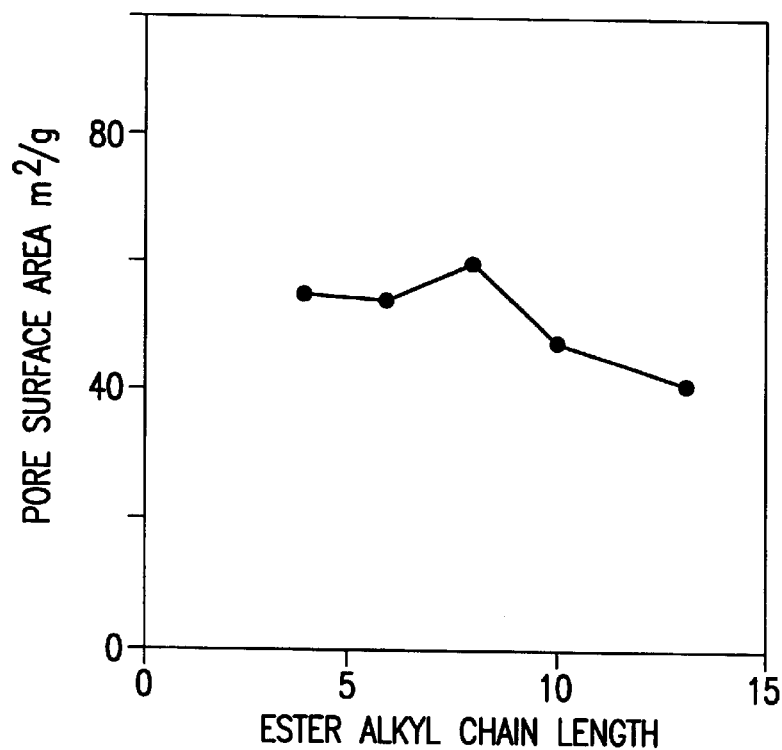
Figure 24:
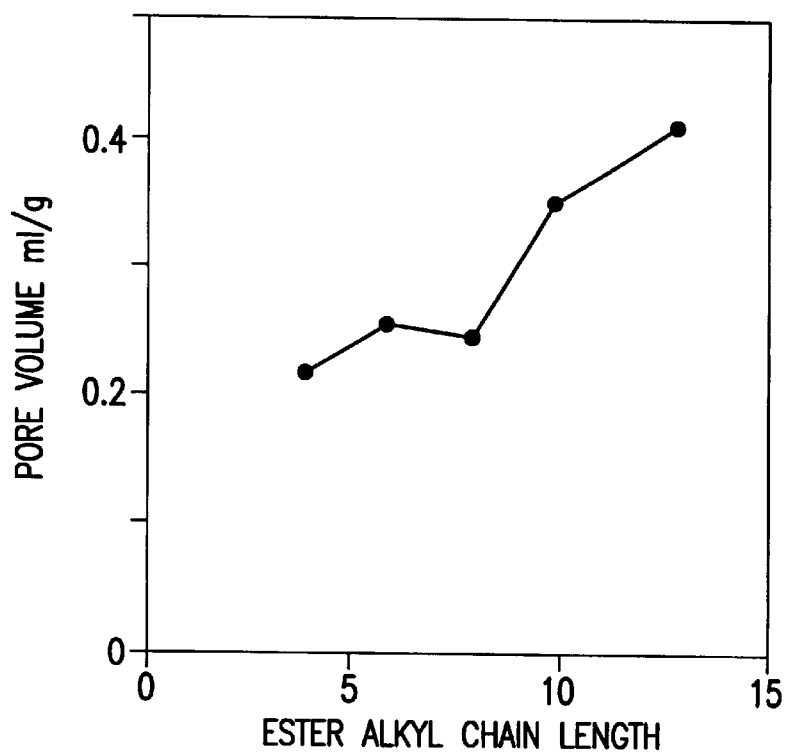
Figure 25:
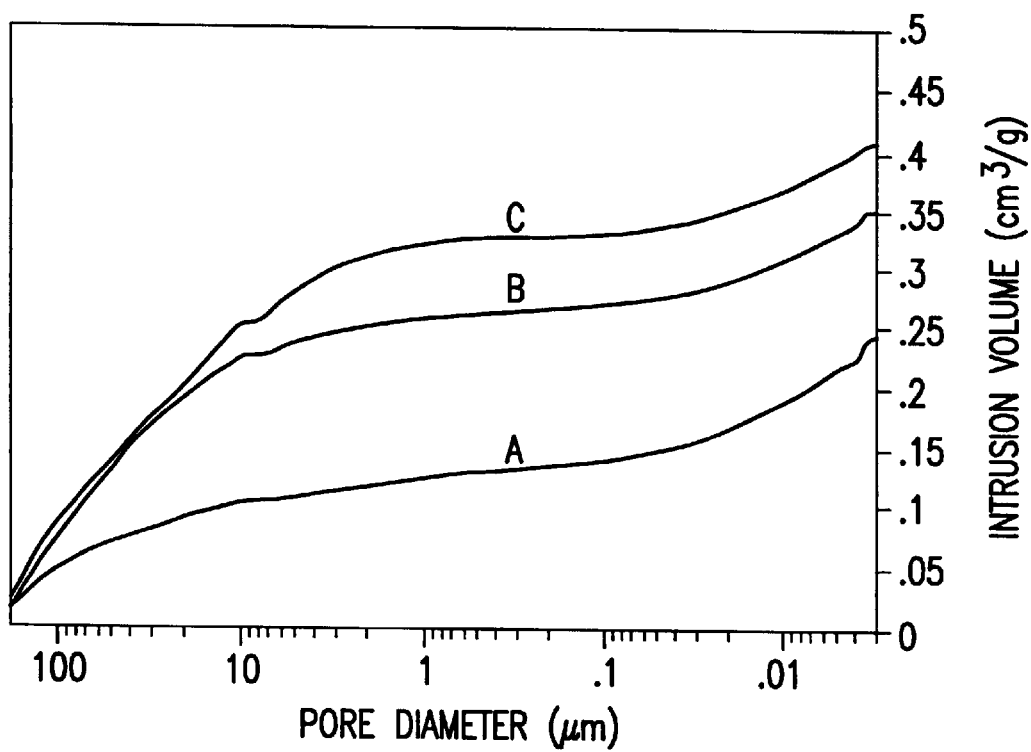

FIG. 22 shows the crystallization temperature of polypropylene as a function of the titanation ($TiCl_4$ treatment) temperature used in the catalyst synthesis;

FIG. 23 show pore surface area ($m^2$/g) in the polymers as a function of the alkyl group chain length in the donor;

FIG. 24 shows pore volume (ml/g) in the polymers as a function of the chain length of the alkyl group in the donor;

FIG. 25 shows pore volume distributions of polymers PP-C-8 (A), PPC-10 (B) and PP-C-13 (C).

DESCRIPTION OF THE INVENTION

The aim of the invention is the provision of an active and stereospecific catalyst composition, which simultaneously has a titanium and phthalic acid content as low as possible. The aim is achieved by the new catalyst composition intended for the polymerization of olefins, which is mainly characterized by what is stated in the claims. It has, thus, been realized that when preparing a catalyst composition by combining $MgCl_2$, a lower alcohol, a titanium compound and an ester of phthalic acid, a transesterification is simultaneously carried out between the lower alcohol and the phthalic acid ester provided the alkoxy group comprises at least 5 carbon atoms.

A $MgCl_2$ carrier can be used as such or it can be combined with silica, e.g. by absorbing the silica with a solution or slurry containing $MgCl_2$. It is also important that the $MgCl_2$ used is pure and non-aqueous. The lower alcohol has the formula ROH where R is a $C_1$–$C_2$ alkyl group. Preferable alcohols are methanol and ethanol, particularly ethanol.

As, because of the replica phenomenon the physical structure of the catalyst carrier repeats itself in the whole catalyst composition and this then in the polymer product obtained, it is very important to make the physical structure of the carrier i.e., the morphology, beneficial i.e. alike the desired product. This can be achieved by proceeding in two different ways, which can, of course, also be combined: chemically i.e. by treating the carrier with certain chemicals, or physically, i.e. by grinding the carrier in a ball mill or in a jet blower mill.

Also a procedure can be used in which an adduct of the carrier, in this case expressly the $MgCl_2$, and a lower alcohol, such as ethanol, is first prepared, which adduct is injected by means of gas into cold solvent or cold gas, whereby the adduct crystallizes to a morphologically preferable form and this crystalline adduct is used as a catalyst carrier (cf. FI-862459).

The titanium compound used in the preparation of the catalyst composition according to the invention is preferably an organic or inorganic titanium compound, which is at the oxidation degree 3 or 4.

Also other transition metal compounds, such as vanadium, zirconium, chromium, molybdenum, and tungsten compounds, can be mixed with the titanium compound, if necessary. The titanium compound usually is halide or oxyhalide, an organic metal halide, or a purely metal organic compound, in which only organic ligands have been attached to the transition metal. Particularly preferable are the titanium halides, expressly $TiCl_4$.

Each alkoxy group of the phthalic acid ester used contains at least 5 carbon atoms. As the above-mentioned good properties become accentuated when the alkoxy groups becomes longer, it is advantageous if the alkoxy groups of the phthalic acid ester each comprise at least 8, and preferably 10 carbon atoms. Thus, among others propylhexyl phthalate (PrHP), with 6 carbon atoms in the alkoxy group, dioctyl phthalate (DOP), with 8 carbon atoms in the alkoxy group, di-isodecyl phthalate (DIDP), with 10 carbon atoms in the alkoxy group, and ditridecyl phthalate (DTDP), with 13 carbon atoms in the alkoxy group, can be used as the ester. The molar ratio of phthalic acid ester and magnesium halide in the synthesis is preferably about 0.2.

It is also preferable if the ester of the phthalic acid used acts as the so-called electron donor of the catalyst composition with the intention to improve the activity and the stereospecifity of the polymer.

The transesterification can be carried out e.g. by selecting a phthalic acid ester—a lower alcohol pair, which spontaneously or by the aid of a catalyst, which does not damage the catalyst composition, transesterifies under normal preparation conditions of the catalyst. Often it is, however, necessary to use an elevated temperature in order to achieve transesterification. Hereby, it is preferably to carry out the transesterification at a temperature which is between 110°–150° and preferably between 130°–140° C.

As the boiling point of the liquid $TiCl_4$ is about 136° C. under normal pressure, a treatment with it or the so-called titanification can normally be carried out only at a temperature lower than that. As usually hydrocarbon solvents, such as heptane, hexane, or pentane, the boiling point of which is remarkably higher, are used as the titanification intermediate agent, the titanification temperature is in practice below 100° C., where transesterification does not take place. Thus, in order to achieve transesterification, solvents having a higher boiling point should preferably be used and e.g. nonane (bp. 151° C.) and decane (bp. 174° C.) are recommended. Hereby, it is possible to approach the boiling point of $TiCl_4$ or even exceed it as a titanification temperature, whereby a simultaneous transesterification titanification reaction becomes possible.

According to one embodiment the transesterification takes place so that the adduct $MgCl_2*nR_1OH$ of magnesium dichloride and lower alcohol in which $R_1$ is a $C_1$ or a $C_2$ alkyl group and, in which n is 1–6, is treated with a titanium compound, e.g. titanified with $TiCl_4$, whereby apparently the following reaction takes place:

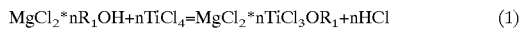

$$MgCl_2*nR_1OH+nTiCl_4=MgCl_2*nTiCl_3OR_1+nHCl \quad (1)$$

When the donor, i.e. the ester of the phthalic acid, is added to this titanified carrier it is very likely that an adduct of all the components is produced:

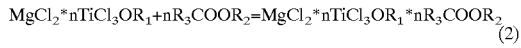

$$MgCl_2*nTiCl_3OR_1+nR_3COOR_2=MgCl_2*nTiCl_3OR_1*nR_3COOR_2 \quad (2)$$

As this adduct can be transesterified at a temperature above 110° C. and preferably at a temperature of over about 130° C., the ester groups $R_1$ and $R_2$ exchange positions.

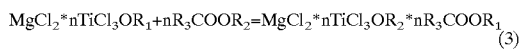

$$MgCl_2*nTiCl_3OR_1+nR_3COOR_2=MgCl_2*nTiCl_3OR_2*nR_3COOR_1 \quad (3)$$

When the waste matter of the catalyst is removed by extraction an adduct of the carrier and the ester donor is obtained, in which the group derived from the alcohol of the ester has been exchanged:

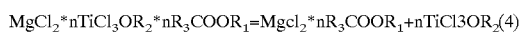

$$MgCl_2*nTiCl_3OR_2*nR_3COOR_1=Mgcl_2*nR_3COOR_1+nTiCl3OR_2 \quad (4)$$

If enough titanium remains on the carrier, it acts as an active part of the catalyst. Otherwise, a new titanification is carried out after the above-mentioned treatment in order to obtain a high enough titanium content and thus activity. The titanium separation of the formula (4) mainly concerns with the inactive part of the titanium.

Thus, in the present invention a catalyst composition intended for the polymerization of olefins has been achieved, the titanium and donor contents of which are low in regard to the activity of the catalyst. The catalyst composition contains according to one embodiment 2.5% by weight of titanium at the most and preferably 2.0% by weight of titanium at the most. Its molar ratio donor/Mg preferably is between 0.03–0.06 and/or its donor content is between 4% to 6% by weight. According to one embodiment of the invention the alkoxy groups of the phthalic acid comprise at least 8 carbon atoms and the activity of the catalyst composition when triethyl aluminum is used as the catalyst and cyclohexylmethyl dimethoxy silane is used as the outer donor is at least about 800 kg PP/g of Ti.

According to the invention the catalyst composition intended for the polymerization of olefins is preferably prepared by:

a) bringing an adduct of $MgCl_2$ and a lower alcohol to react with $TiCl_4$, b) bringing the product of the state a) to react with an ester of the phthalic acid under conditions where a transesterification takes place between the ester of phthalic acid and the lower alcohol, c) washing the product, d) bringing the end product of the stage c) to optionally react with $TiCl_4$ (i.e. another treatment with $TiCl_4$).

The invention also relates to the use of the above described catalyst composition for the polymerization of propene so that the polymerization is carried out in the presence of an organometallic cocatalyst, such as tri-lower alkylaluminum, and preferably an outer donor like cyclohexylmethyl dimethoxy silane. The polymer produced contains, among others, a little titanium and donor and resembles morphologically the catalyst composition used.

In the following example, a method for the polymerization of olefins is described. In this method propene is polymerized with a catalyst composition, in which a spray crystallized $MgCl_2\times EtOH$ adduct is used as the carrier, which adduct has then been titanificated with $TiCl_4$ in a hydrocarbon solvent in the presence of dialkylphthalates of different length. By the aid of the catalyst composition thus obtained and the trialkylaluminum cocatalyst (triethylaluminum TEA) and the outer donor (cyclohexylmethyl dimethoxy silane CMMS) propene was polymerized in a hydrocarbon solvent. If a titanification temperature high enough is used a transesterification takes place between the ethoxy groups derived from the carrier adduct and the long alkyl groups of the donor and the donor compound produced will be diethyl phthalate (DEP). The aim of the following examples is only to illustrate the invention.

EXAMPLES

DONORS EXAMINED

In the test series 5 donors were tested. They have all been disclosed in Table 1. The donors tested were propylhexyl phthalate (PrHP), dioctyl phthalate (DOP), di-isodecyl phthalate (DIDP), and ditridecyl phthalate (DTDP). In addition to this di-isobutyl phthalate (DIBP) was included in the test series.

TABLE 1

The tested internal donors

| Test | Length of the alkyl group | Donor | Molar Mass g/mole | g/ml Density |
|---|---|---|---|---|
| 1 | 4 | DIBP | 278 | 1.00 |
| 2 | 6 | PrHP | 292 | 0.95 |
| 3 | 8 | DOP | 390 | 0.96 |
| 4 | 10 | DIDP | 446 | 0.96 |
| 5 | 13 | DTDP | 530 | 0.91 |

Catalyst Synthesis 0.1 mole of $MgCl_2\times3$ EtOH was suspended under inert conditions in 250 ml of decane in a reactor. The solution was cooled to the temperature of −15° C. and 300 ml of cold TiCl$_4$ was added. Then a controlled heating to the temperature of +20° C. was carried out. At this temperature 0.02 mole of the internal donor was added. In all the catalyst syntheses the molar ratio between the donor and the MgCl$_2$ was 0.2. When all the synthesis reagents were present, the temperature was raised to 135° C. Both the first and the second titanification were carried out at this temperature. The catalyst synthesis was ended by washing the reaction mixture.

In order to find out the particle size of the catalyst produced, the particle size distribution was measured out and microscope pictures were taken of each sample. Moreover, the chemical composition of the catalysts was measured by analyzing their Ti, Mg and donor contents. Also X-ray diffraction spectra were taken for the examination of the changes taking place in the crystal structure.

Test Polymerization

For all the catalysts a test polymerization was carried out under the following polymerization conditions. A 2-liter bench reactor was used as the reaction vessel. In the test polymerization 20 to 30 g of catalyst was used. This amount was mixed with 620 µl of triethylaluminum and 200 µl of a 25% solution of CMMS in 30 ml of heptane. The polymerizations were carried out at a temperature of +70° C. and in a propene monomer pressure of 10 bar. The partial hydrogen pressure was 0.2 bar during the polymerization. The polymerization lasted 3 hours. In the beginning of the test a prepolymerization took place in those ten minutes when the temperature and the pressure rose to the desired polymerization conditions. The activity was measured on the basis of the polymerization yield. The soluble portion of the polymer was measured by evaporating the measured amount of the polymerization solution. By using these standard polymerization conditions a polymer material was prepared, the MFR (melt flow rate) of which was about 8.

Characterization of the Polymerizing Batches

The bulk density and the particle size distribution (PSD) of all the polymerization batches were measured. The isotacticity was measured by the aid of heptane elution and the isotacticity index was determined from the results obtained from the evaporation residue measurings. The melt index was measured at the temperature of 230° C. using a weight of 2.16 kg. Microscope pictures were taken from all the polymerization batches for documentation and comparison purposes. Differential scanning calorimetry curves (DSC curves) were taken for the characterizing of the melt behavior of the material. The specific surface and the pore volume distribution were measured by the aid of Hg porosimetry equipment.

The Results

In Table 2 the codes of all the catalysts and the corresponding polymers are presented.

TABLE 2

The symbols of the catalysts and polymers used in the test

| Length of the alkyl group | Symbol of the Catalyst | Symbol of the Polymer |
| --- | --- | --- |
| 4 | C-C-4 | 1 PP-C-4 |
| 6 | C-C-6 | 2 PP-C-6 |
| 8 | C-C-8 | 3 PP-C-8 |
| 10 | C-C-10 | 4 PP-C-10 |
| 13 | C-C-13 | 5 PP-C-13 |

The Titanium Content of the Catalyst

Figure 1:
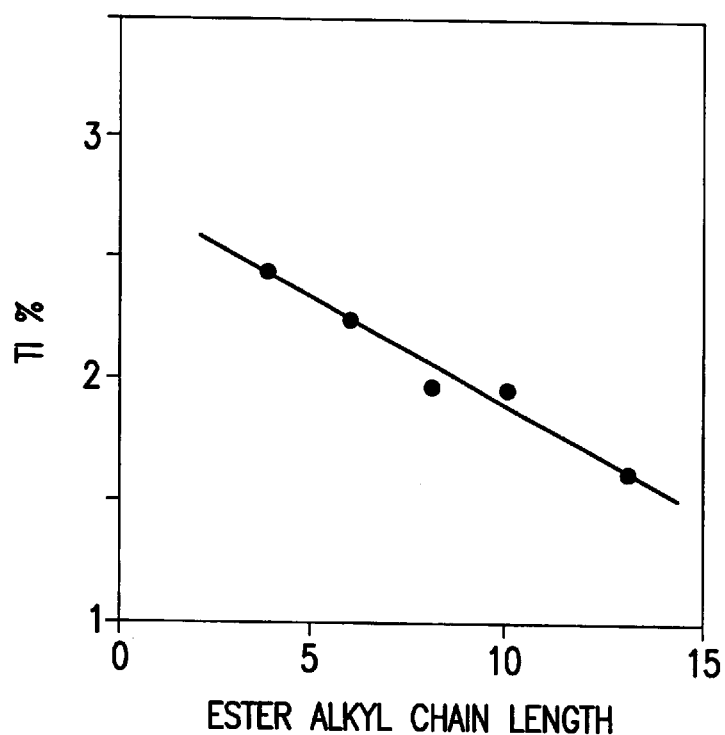
FIG. 1 is a graph showing Ti concentration in the catalysts as a function of the alkyl group chain length in the donor.

The magnesium and titanium contents of the catalyst are shown in Table 3. The titanium content is also disclosed in FIG. 1. The results show that when the Mg content remained substantially unchanged a systematic decrease of the Ti-content was observed in the catalyst series. The longer was the alkyl chain of the electron donors alkoxy group, the smaller was the Ti-content of the final catalyst. The Ti-content of the last catalyst of the series was 1.6% by weight. This is a 60% smaller value that the 4% value which was achieved in the standard synthesis and even 30% lower than the titanium content found in commercial high-yield catalysts. These results show that the combination of transesterification and the washing effect of TiCl$_3$xOEt worked better when higher phthalic acid esters were used.

TABLE 3

The Mg- and Ti-content of the catalysts

| Length of the alkyl chain | Mg (%) | Ti (%) |
| --- | --- | --- |
| 4 | 18.1 | 2.4 |
| 6 | 20.8 | 2.2 |
| 8 | 22.0 | 1.9 |
| 10 | 20.0 | 1.9 |
| 13 | 17.3 | 1.6 |

The Catalyst Yield of the Catalyst Synthesis

Figure 2:
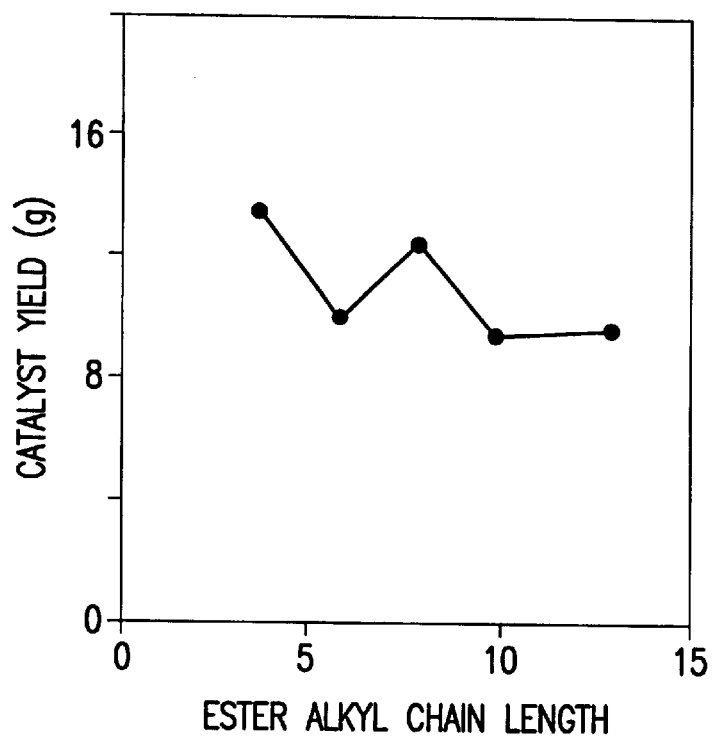
FIG. 2 is a graph showing total catalyst yield of the catalyst synthesis as a function of the alkyl group chain length in the donor.

The respective catalyst yields of each catalyst synthesis have been shown in Table 4 and the results have been disclosed graphically in FIG. 2. The same trend is noticeable as in the first measuring, i.e. that when the phthalate alkyl chain grew longer and the titanium content became smaller, the yield of the catalyst decreased. The decrease of the yield is very insignificant, only about 258 and is explained by the decrease of the TiCl$_4$-content of the catalyst and by the decrease of weight which occurs when the electron donor having a higher molar mass is changed to an electron donor having a smaller molar mass. The decrease of the catalyst yield is also explained by the decrease of the total donor content.

TABLE 4

The catalyst yield of the catalyst synthesis

| Length of the alkyl group | Yield (g) |
| --- | --- |
| 4 | 13.3 |
| 6 | 10.0 |
| 8 | 12.4 |
| 10 | 9.1 |
| 13 | 9.2 |

The Donor Content of the Catalysts

Figure 3:
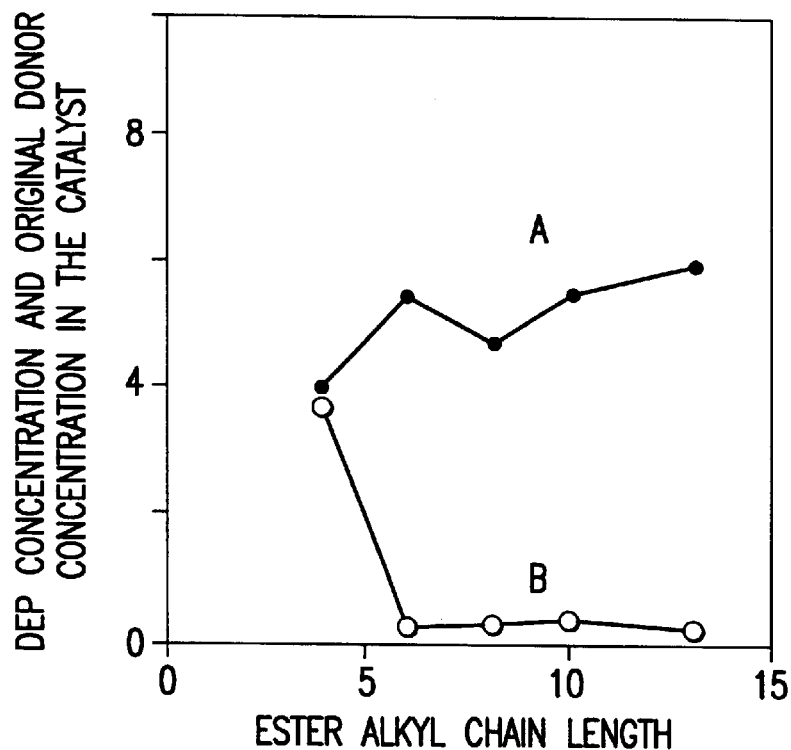
FIG. 3 is a graph showing DEP concentration and original donor concentration in the catalyst.

The donor content of the catalysts was measured liquid chromatometrically by HPLC-method. The results are listed in Table 5 and are presented graphically in FIG. 3. In all catalysts a small fraction of mixed esters were observed and a small fraction of phthalic acid anhydride. As appears from FIG. 3 the transesterification was not complete as far as the first catalyst of the series is concerned. The transesterification degree of DIBP was only 70%. This means the DIBP does not become transesterified completely at a temperature of 135° C. In all the other syntheses the transesterification was complete. In their products only traces of the original ester were found. The amount of the transesterified diethyl phthalate (DEP) found in the catalysts was nearly constant and close to 5%. This corresponds to the D/Mg ratio 0.03 to 0.04 (D=donor), which is even a lower value than what was achieved when DIBP was transesterified at the temperature of 143° C.

These results show that the transesterification improves if longer alkyl chains are used in phthalic acid esters. It appears simultaneously that a low electron donor/MgCl$_2$ molar ratio is achieved.

TABLE 5

The donor composition of the catalysts. PA = acid anhydride and IE = mixed esters produced during the transesterification

| Length of the alkyl group | Original (%) | DEP (%) | PA (%) | IE (%) |
|---|---|---|---|---|
| 4 | 3.6 | 4.0 | 1.3 | 1.0 |
| 6 | 0.2 | 5.3 | 0.3 | 0.9 |
| 8 | 0.3 | 4.8 | 0.7 | 0.4 |
| 10 | 0.4 | 5.3 | 1.1 | 0.5 |
| 13 | 0.2 | 5.9 | 0.1 | 0.4 |

The Particle Size Distribution (PSD) of the Catalysts

Figure 4:
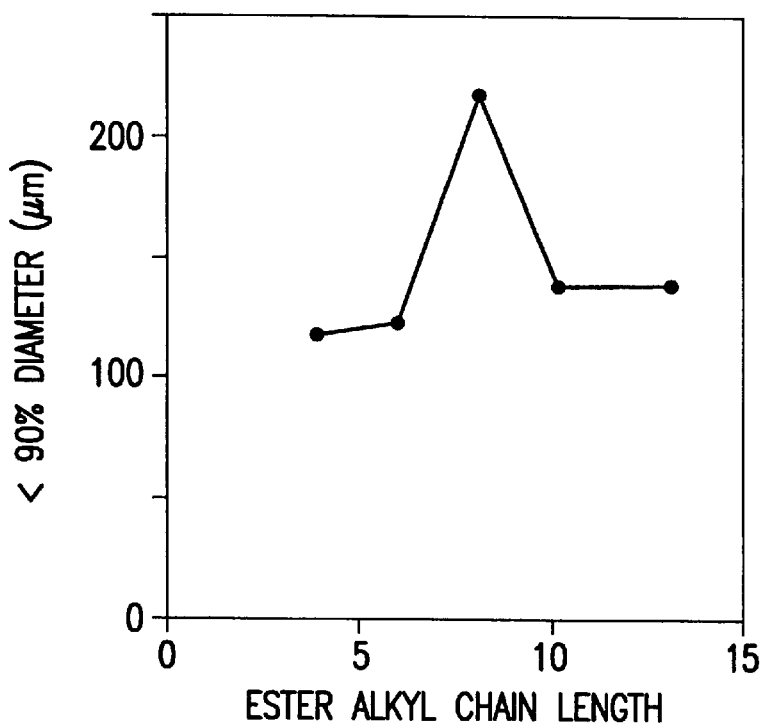
FIG. 4 is a graph showing the diameter of the large particle fraction (<90%) as a function of the alkyl group chain length in the donor.
Figure 5:
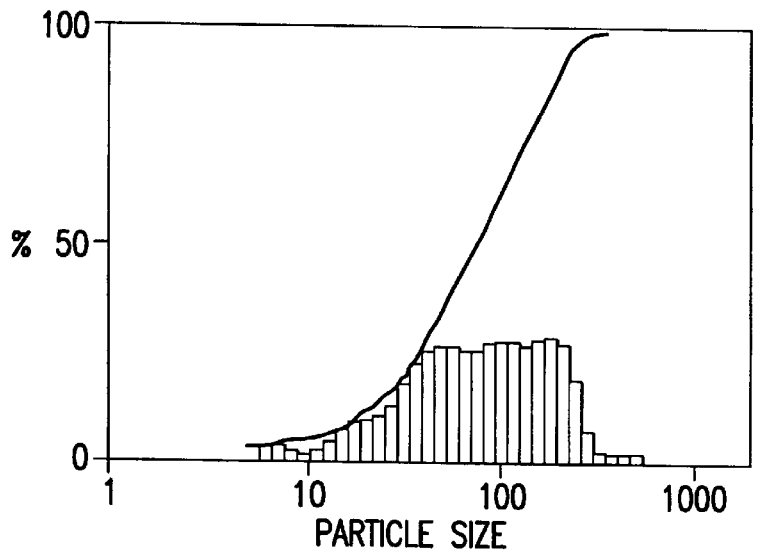
FIG. 5 is a graph showing the catalyst particle size distribution when octyl phthalate (C=8) was used as an internal donor.
Figure 6:
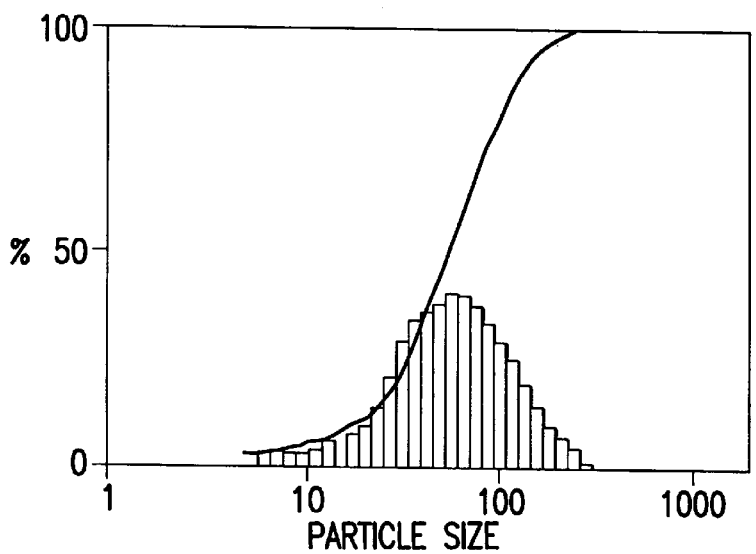
FIG. 6 is a graph showing the catalyst particle size distribution when decyl phthalate (C=10) was used as an internal donor.
Figure 7:
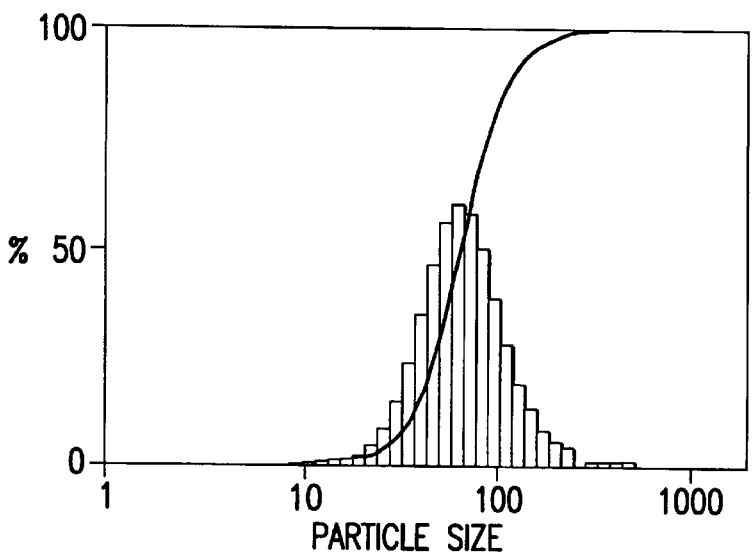
FIG. 7 is a graph showing the catalyst particle size distribution when tridecyl phthalate (C=13) was used as an internal donor.
Figure 8:
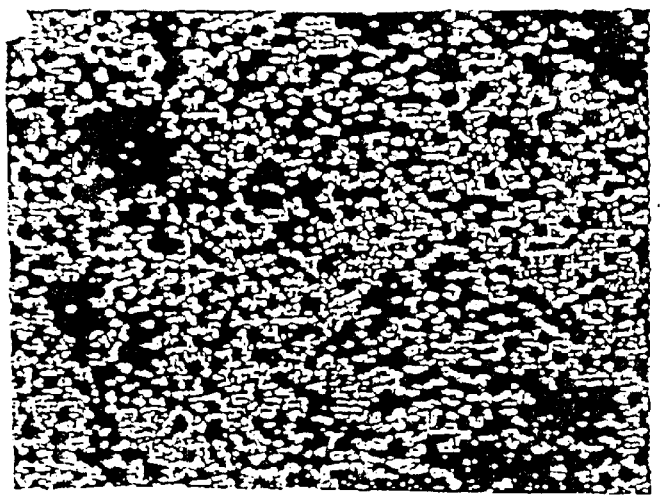
FIG. 8 is a microscope picture of the catalyst C-C-4. C=4, unit=25 μm.
Figure 9:
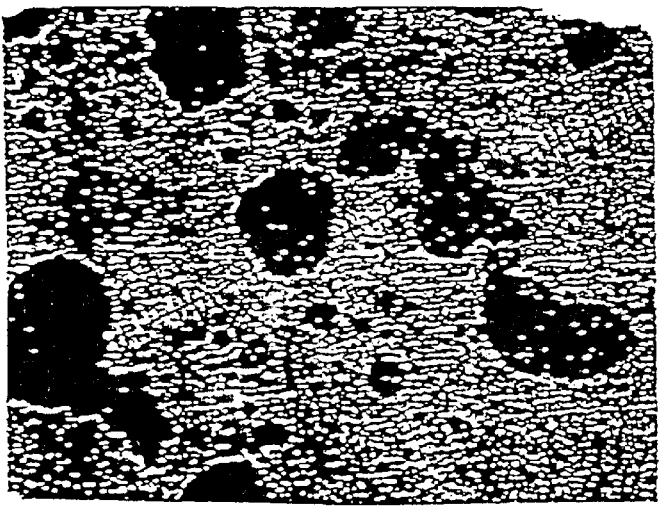
FIG. 9 is a microscope picture of the catalyst C-C-8. C=8, unit=50 μm.
Figure 10:
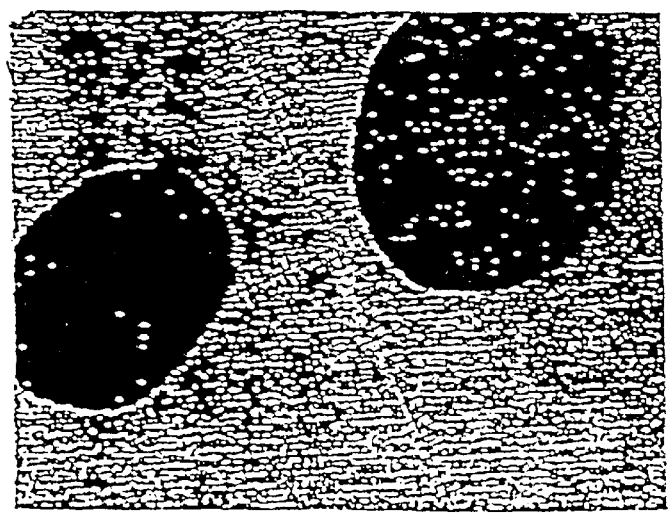
FIG. 10 is a microscope picture of the catalyst C-C-10. C=8, unit=50 μm.

Also the PSD of the catalysts was measured and the results are shown in table 6. In FIG. 4 there has been presented the average particle diameter of the portion which comprised over 90% of the particles as a function the length of the donor's alkyl chain. The results show that when the donor composition changes also the PSD changed greatly. Simultaneously, it could be noted that the catalyst particles agglomerated when higher phthalic acid esters were used. This agglomeration can be seen in the PSD-curves of the FIGS. 5, 6, and 7 and in the microscope pictures of FIGS. 8, 9 and 10. The results also show that the agglomeration decreased a little with higher phthalic acid esters. By using DIDP (C=10) catalyst particles with a very beautiful shape were obtained, the diameter of which was about 140 μm. This appears from FIG. 10.

TABLE 6

Particle size distribution of the catalysts

| Length of the alkyl group | D (0.9) μm | D (0.5) μm | D (0.1) μm |
|---|---|---|---|
| 4 | 117 | 62 | 34 |
| 6 | 127 | 68 | 36 |
| 8 | 218 | 76 | 17 |
| 10 | 138 | 56 | 18 |
| 13 | 140 | 69 | 36 |

The X-ray Diffraction Spectra of the Catalysts

Figure 11:
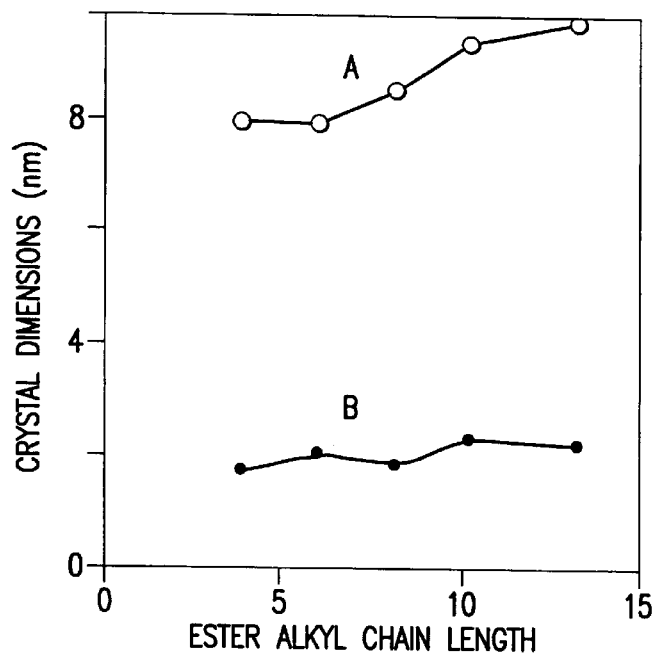
FIG. 11 is a chart showing a $MgCl_2$ crystal dimension function of ester alkyl chain length with A being width and B being height.

As a result of the transesterification a new catalyst structure was produced, which appears from the double peak at 13 to 15°. To follow the influence of the higher phthalate esters, the X-ray diagrams were taken of all catalysts of the test series. The crystal dimensions derived from the diagrams are listed in Table 7 and the results are also presented in FIG. 11. According to the results the crystal became systematically broader when the alkyl chain became longer. With DTDP was achieved 25t broader crystals than what was achieved with DIBP.

Figure 12:
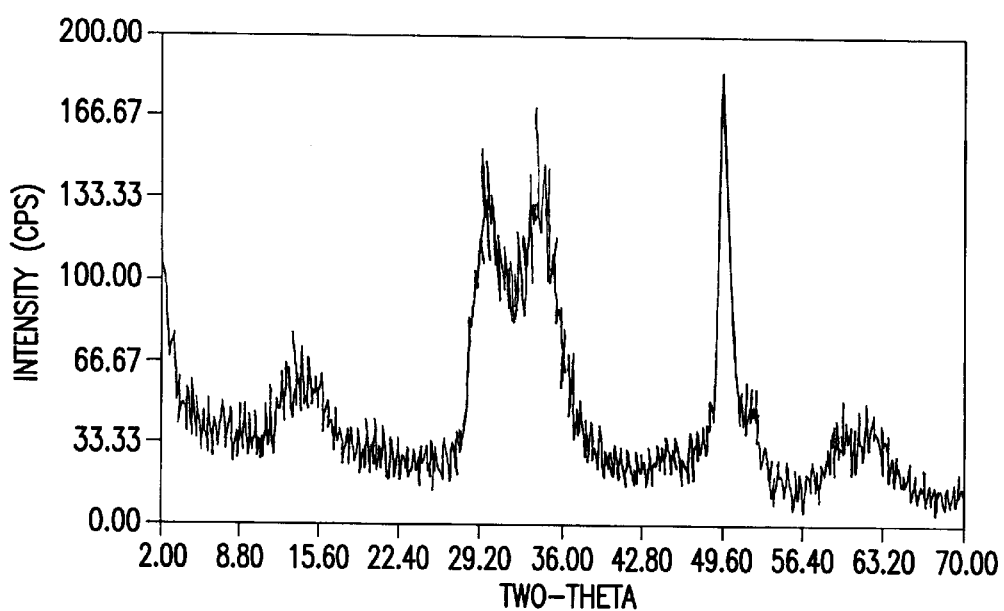
FIG. 12 shows an x-ray pattern of the catalyst C-C-6, in which internal donor PrHP has been transesterified to DEP. A double peak is observable at 13°–15°.

The X-ray diffraction spectrum of the catalyst C-C-6 has been presented in FIG. 12. According to the diagram recrystallization appears in $MgCl_2$-crystal lattice, which becomes apparent in the sharpening of the crystal peak at points 30° and 35°. Also the formation of the double peak at point 13° to 15° can be seen.

TABLE 7

The crystal dimensions of the $MgCl_2$ material of the catalysts
Section planes

| Length of the alkyl group | Height (nm) | Breadth (nm) | Growth (%) |
|---|---|---|---|
| 4 | 1.8 | 7.9 | 0 |
| 6 | 2.1 | 7.9 | 0 |
| 8 | 1.9 | 8.4 | 6 |
| 10 | 2.3 | 9.3 | 18 |
| 13 | 2.2 | 9.8 | 24 |

The Surface Area and the Pore Volume of the Catalysts

From the catalysts were measured both the surface area and the pore volume. The results have been listed in Table 8. According to the results the surface area of the catalysts remained nearly unchanged independent of the donor used in the synthesis. The specific surface achieved was of the size class about 300 $m^2/g$. The pore volume, on the other hand, grew when transferring into donors with longer chains. In the last catalyst of the series, an increase of as much as 60% was observed. The growth of the pore volume can partly be explained by the agglomeration of the catalyst particles.

TABLE 8

The specific surface area and the pore volumes of the catalysts

| Length of the alkyl group | Surface area (m2/g) | Pore volume (ml/g) |
|---|---|---|
| 4 | 348 | 0.524 |
| 6 | 316 | 0.738 |
| 8 | 311 | 0.581 |
| 10 | 339 | 0.776 |
| 13 | 292 | 0.814 |

Activity of the Catalysts

Figure 13:
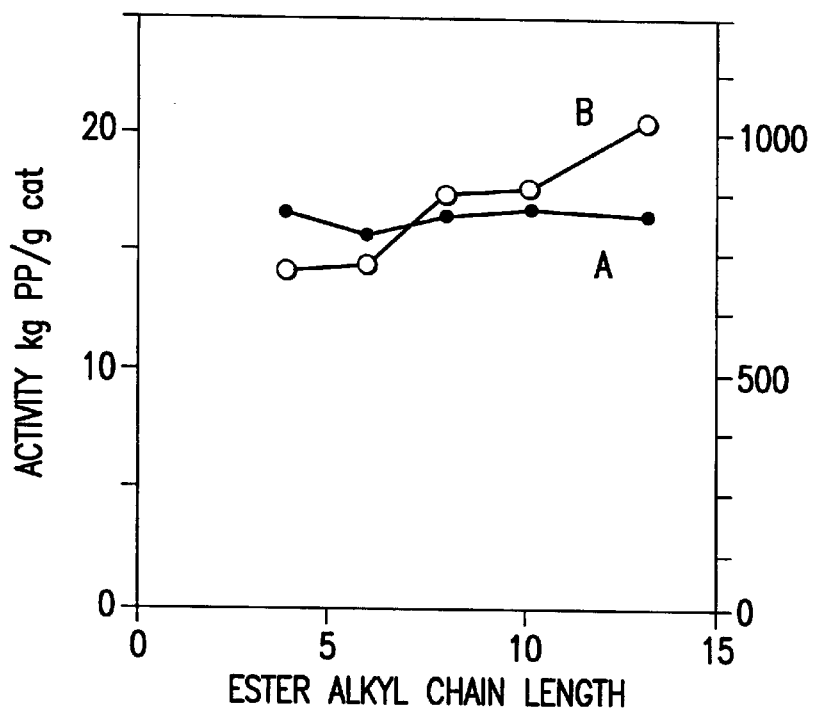
FIG. 13 shows catalyst activity as a function of the alkyl group chain length in the donor. Curve (A) refers to the unit kg PP/g cat. and curve (B) to the unit kg PP/g Ti.

All the catalysts were test polymerized in the above mentioned conditions. The results have been presented in Table 9 and FIG. 13. The activity based on the weight of the catalyst and the polymer remained constant for the whole catalyst series and was about 16 kg/g cat. When expressed in unit kg PP/g Ti the activity systematically increased. This was due to the fact that the Ti-content decreased correspondingly when transferring into higher phthalic acid esters. Thus, the activity value 1019 kg PP/g Ti was obtained for the last catalyst of the series. When decane was used as the activation medium the activity of the catalyst was a little smaller.

TABLE 9

Activity of the catalyst

| Length of the alkyl group | Activity (kg PP/g cat) | Activity (kg PP/q Ti) |
|---|---|---|
| 4 | 16.6 | 692 |
| 6 | 15.6 | 709 |
| 8 | 16.2 | 853 |
| 10 | 16.3 | 874 |
| 12 | 16.3 | 1019 |

The Particle Size Distribution (PSD) of the Polymers

Figure 17:
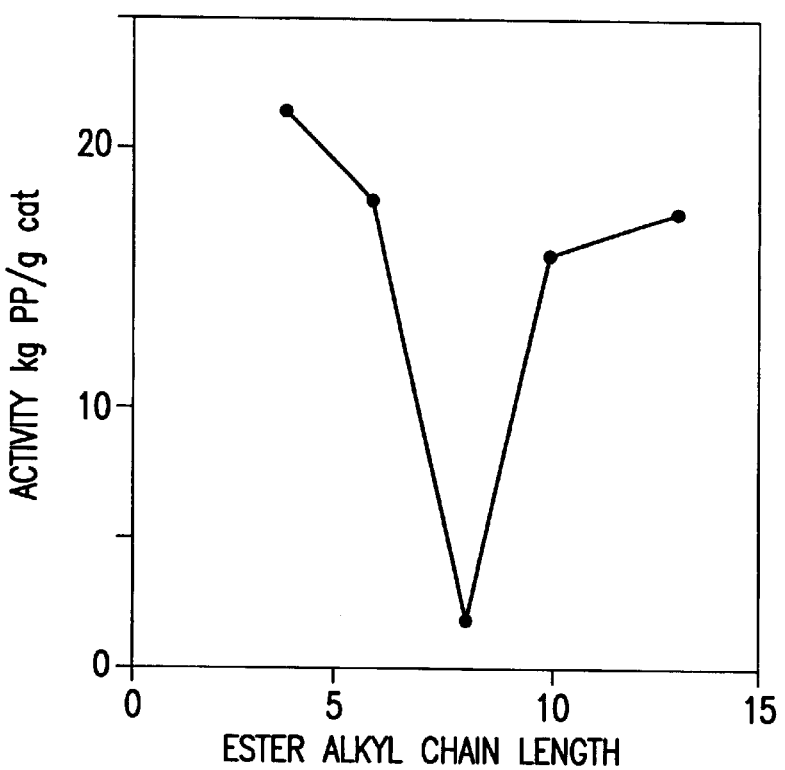
FIG. 17 shows total amount of fines fraction (d<1 mm) as a function of the alkyl group chain length in the donor.

In Table 10 the PSD of the polymers has been presented together with the total amount of the fine cut i.e. the particles below 1 mm. The amount of the fine cut has also been presented graphically in FIG. 17.

Figure 14:
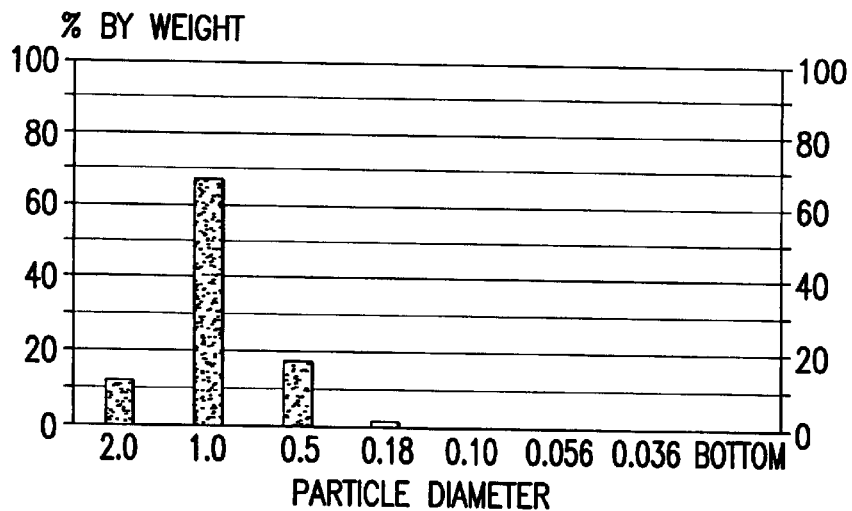
FIG. 14 is a bar graph showing particle size distribution of the polymer PP-C-4 (C=4)
Figure 15:
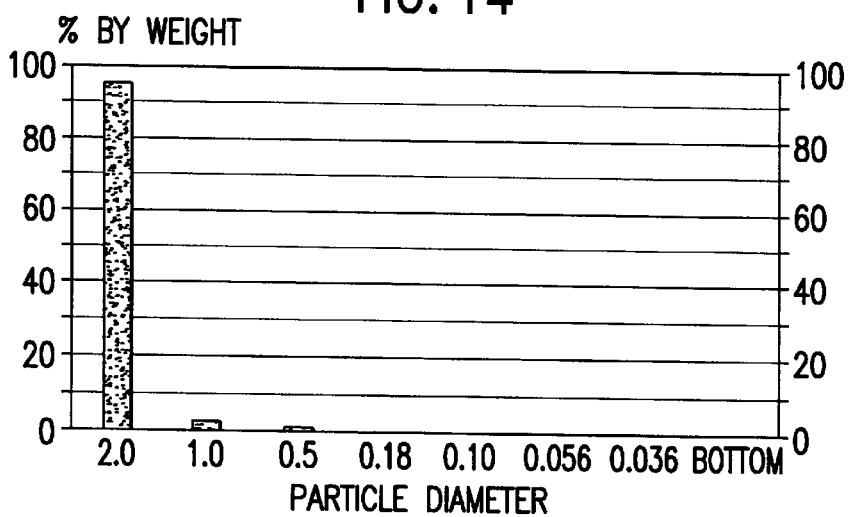
FIG. 15 is a bar graph showing particle size distribution of the polymer PP-C-8 (C=8)
Figure 16:
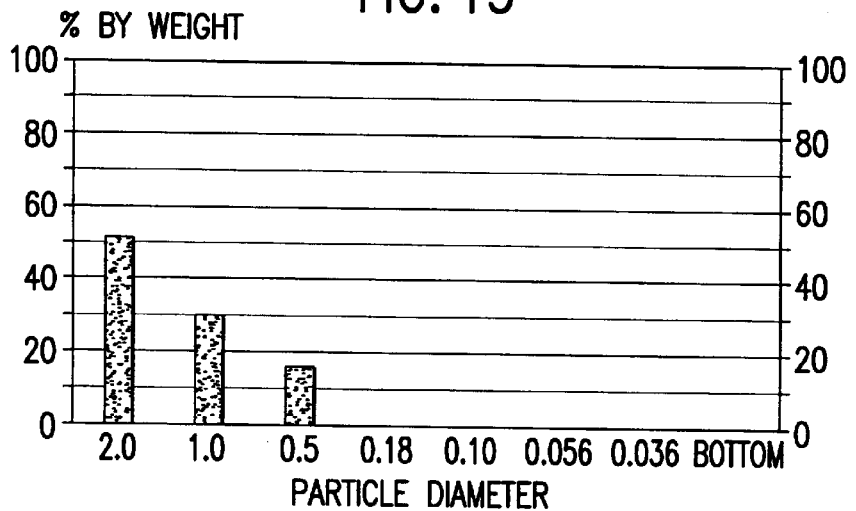
FIG. 16 is a bar graph showing particle size distribution of the polymer PP-C-13 (C=13)

The PSD results of the polymers follow the same model as the PSD results of the catalysts. This appears from the PSD diagrams of FIGS. 14, 15, and 16.

TABLE 10

Particle size distribution of the polymers

| Length of the alkyl group | % <2.0 mm | % '1.0 mm | % <0.5 mm | % <0.18 mm | % <0.10 mm | % <0.056 mm | Rest (%) |
|---|---|---|---|---|---|---|---|
| 4 | 12.0 | 67.4 | 18.5 | 1.8 | 0.2 | 0.1 | 20.6 |
| 6 | 10.7 | 71.3 | 17.7 | 0.2 | 0.1 | 0.0 | 18.0 |
| 8 | 95.0 | 3.1 | 1.1 | 0.5 | 0.2 | 0.1 | 1.9 |
| 10 | 14.6 | 69.4 | 15.5 | 0.5 | 0.2 | 0.1 | 1.9 |
| 13 | 52.1 | 30.4 | 17.1 | 0.2 | 0.1 | 0.1 | 17.5 |

The Bulk Density of the Polymers

Figure 18:
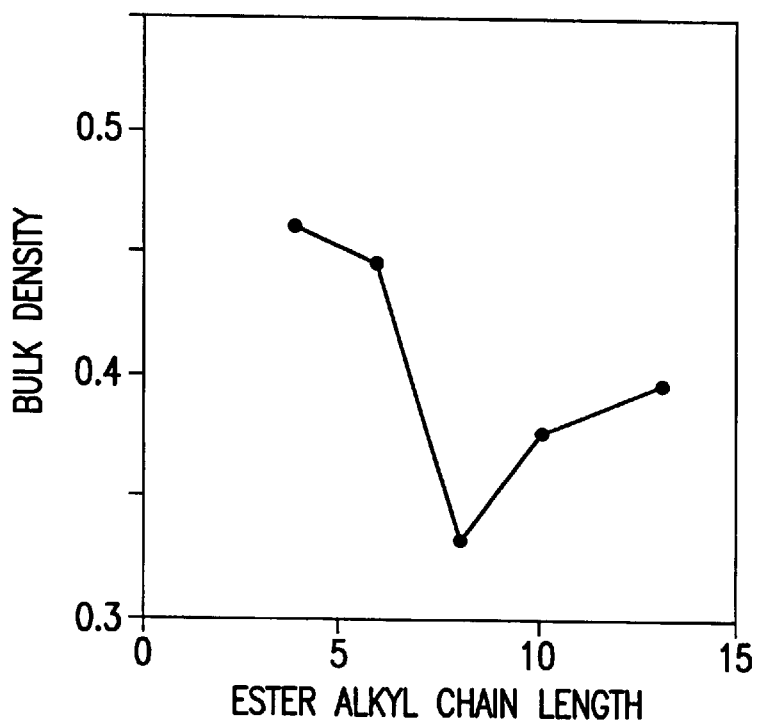
FIG. 18 shows the bulk density of the polymers as a function of the alkyl group chain length in the donor.

The bulk density decreased when higher phthalic acid esters were used in the transesterification synthesis. The results have been listed in Table 11 and presented in FIG. 18.

TABLE 11

The bulk density of the polymers

| Length of the alkyl group | Bulk density (g/ml) |
|---|---|
| 4 | 0.46 |
| 6 | 0.44 |
| 8 | 0.33 |
| 10 | 0.37 |
| 12 | 0.39 |

The Melt Index of the Polymers

The chain length of the ester did not significantly effect the melt index. The results have been presented in Table 12.

TABLE 12

The melt index of the polymers

| Length of the alkyl group | Melt index (2.16 kg) |
|---|---|
| 4 | 10.5 |
| 6 | 9.3 |
| 8 | 10.0 |
| 10 | 7.3 |

Molecular Weight of the Polymers

No systematic changes of the molecular weight distribution could be observed when the ester changed. All results have been listed in Table 13. The results correspond to the results normally obtained in standard polymerization.

TABLE 13

Molecular weight distribution of polymers

| Length of the alkyl group | Mn | Mw | Mv | D |
|---|---|---|---|---|
| 4 | 58,000 | 173,000 | 223,000 | 4.7 |
| 4 | 58,800 | 274,000 | 222,000 | 4,7 |
| 6 | 56,000 | 281,000 | 225,000 | 5,2 |
| 6 | 55,200 | 289,000 | 232,000 | 5.2 |
| 8 | 60,100 | 273,000 | 221,000 | 4.6 |
| 8 | 60,700 | 279,000 | 228,000 | 4.6 |
| 10 | 73,800 | 331,000 | 269,000 | 4.5 |
| 10 | 74,600 | 334,000 | 270,000 | 4.5 |

The DSC Measuring Results of the Polymers

Figure 19:
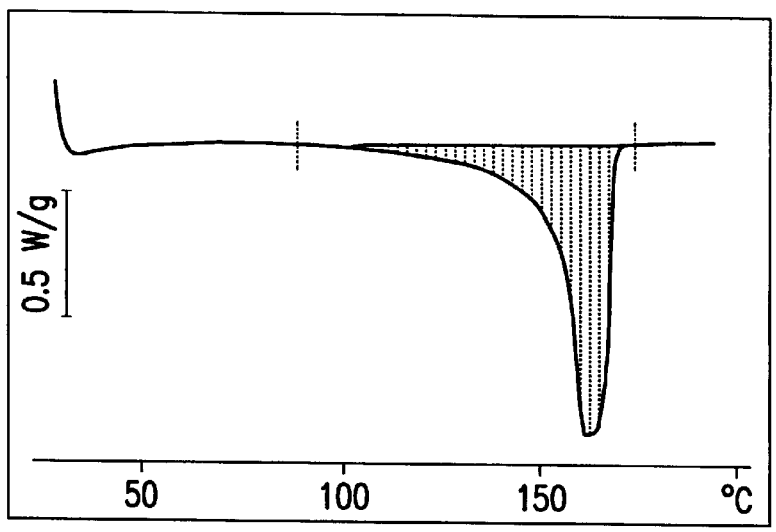
FIG. 19 shows a DSC (differential scanning calorimeter) curve of the polymer PP-C-4.

In Table 14 the melting points, the crystallization points and the crystallinity percentages of the polymers have been listed. Neither could it be observed here any systematic dependency of the esters used. The melting point is about 161° C. and the crystallizing temperature about 114° C. The crystallinity was about 51–52%. In FIGS. 19, 20, and 21 some melting curves have been presented.

It can generally be said that a correlation prevails between the titanification temperature and the crystallization temperature of the catalyst. A higher titanification temperature gives purer catalyst and more homogeneous polypropene. This, on its part, increases the crystallinity of the polymer and decreases the crystallizing temperature. The correlation between the titanification temperature of the catalyst and the crystallizing temperature of the polymer is schematically presented in FIG. 22

TABLE 14

The melting temperature, crystallizing temperature and crystallinity of the polymers

| Length of the alkyl group | Crystallinity ° C. | Melting ° C. | Crystallizing % |
|---|---|---|---|
| 4 |  | 161.6 | 114.1 | 51.4 |
| 6 |  | 161.0 | 113.5 | 50.7 |
| 8 |  | 161.6 | 113.4 | 51.8 |
| 10 |  | 161.6 | 114.7 | 52.7 |
| 13 | 158.3 | 164.3 | 114.8 | 51.9 |

The Specific Surface Area and Pore Volume Distribution of the Polymers

In Table 15 the results of the surface area and pore volume measurements have been presented. The measurings were carried out by Hg porosimetry equipment. The results corresponded to the results obtained with corresponding catalysts. As appears from FIG. 23, the specific surface area of the pores decreases only a little when higher phthalic acid esters are used in the transesterification. The pore volume, on the other hand, increased linearly according to FIG. 24 dependent on the length of the alkyl chain of the phthalic acid ester. The increase was about 100% at the last polymer of the series compared with the first polymer of the series. According to FIG. 25 DIDP increased greatly the portion of the macropore fraction (10–100 μm), whereas DTDP increased the portion of the micropores (1–10 μm).

TABLE 15

The specific surface area, pore volume and mediane diameter of the polymers

| Length of the alkyl group | Surface Area (m2/g) | Pore volume (ml/g) | Diameter of pore, (μm) |
|---|---|---|---|
| 4 | 53.5 | 0.22 | 1.2 |
| 6 | 52.4 | 0.25 | 4.9 |
| 8 | 58.5 | 0.24 | 1.5 |
| 10 | 46.0 | 0.35 | 26.3 |
| 13 | 41.2 | 0.41 | 18.8 |

What is claimed is:

1. A catalyst composition for polymerizing olefins, which catalyst composition is prepared by the steps comprising of:

(a) combining a solid magnesium chloride carrier, an alcohol, a titanium compound and a donor comprised of a first alkyl ester of phthalic acid in an inert hydrocarbon to form an intermediate catalyst mixture, said alcohol having a formula ROH wherein R is a $C_1$–$C_2$ alkyl group, said first alkyl ester of phthalic acid including an alkyl group containing at least five carbon atoms, said inert hydrocarbon having a boiling point which is greater than the boiling point of said titanium compound, said titanium compound including titanium having an oxidation degree of at least three;

(b) heating said intermediate catalyst mixture to a reaction temperature between about 110–150° C. for a time period to transesterify said alcohol and said first alkyl ester of phthalic acid into a transesterification product having a second ester of phthalic acid containing said $C_1$–$C_2$ alkyl group; and (c) recovering said transesterification product as said catalyst composition, said transesterification product containing up to about 2.5 weight percent titanium and has a molar ratio donor/Mg of at least about 0.03.

2. A catalyst composition as defined in claim 1, wherein said magnesium halide donor is magnesium chloride.

3. A catalyst composition as defined in claim 1, wherein said alcohol is selected from the group consisting of methanol, ethanol and mixtures thereof.

4. A catalyst composition as defined in claim 2, wherein said alcohol is selected from the group consisting of methanol, ethanol and mixtures thereof.

5. A catalyst composition as defined in claim 1, wherein said titanium compound is selected from the group consisting of titanium halides, titanium oxyhalides, organic titanium halides, organic titanium compounds and mixtures thereof.

6. A catalyst composition as defined in claim 4, wherein said titanium compound is selected from the group consisting of titanium halides, titanium oxyhalides, organic titanium compounds and mixtures thereof.

7. A catalyst composition as defined in claim 5, wherein said titanium compound is $TiCl_4$.

8. A catalyst composition as defined in claim 6, wherein said titanium compound is $TiCl_4$.

9. A catalyst composition as defined in claim 1, wherein alkyl group of said first alkyl ester of phthalic acid contains at least eight carbon atoms.

10. A catalyst composition as defined in claim 9, wherein said alkyl group contains at least ten carbon atoms.

11. A catalyst composition as defined in claim 1, wherein said first alkyl ester of phthalic acid is selected from the group consisting of propylhexyl phthalate, dioctyl phthalate, di-isodecyl phthalate, ditridecyl phthalate and mixtures thereof.

12. A catalyst composition as defined in claim 8, wherein said first alkyl ester of phthalic acid is selected from the group consisting of propylhexyl phthalate, dioctyl phthalate, di-isodecyl phthalate, ditridecyl phthalate and mixtures thereof.

13. A catalyst composition as defined in claim 1, wherein said inert hydrocarbon is selected from the group consisting of nonane, decane and mixtures thereof.

14. A catalyst composition as defined in claim 12, wherein said inert hydrocarbon is selected from the group consisting of nonane, decane and mixtures thereof.

15. A catalyst composition as defined in claim 1, wherein said intermediate catalyst mixture is heated to a reaction temperature of about 130–140° C.

16. A catalyst composition as defined in claim 8, wherein said intermediate catalyst mixture is heated to a reaction temperature of about 130–140° C.

17. A catalyst composition as defined in claim 14, wherein said intermediate catalyst mixture is heated to a reaction temperature of about 130–140° C.

18. A catalyst composition as defined in claim 1, wherein said transesterification product contains up to about 2.0 weight percent titanium.

19. A catalyst composition as defined in claim 17, wherein said transesterification product contains up to about 2.0 weight percent titanium.

20. A catalyst composition as defined in claim 16, wherein said transesterification product contains up to about 2.0 weight percent titanium.

21. A catalyst composition as defined in claim 1, wherein said molar ratio donor/Mg of said transesterification product is about 0.03–0.06.

22. A catalyst composition as defined in claim 19, wherein said molar ratio donor/Mg of said transesterification product is about 0.03–0.06.

23. A catalyst composition as defined in claim 20, wherein said molar ratio donor/Mg of said transesterification product is about 0.03–0.06.

24. A catalyst composition as defined in claim 1, wherein said transesterification product includes a donor content of about 4–6 weight percent.

25. A catalyst composition as defined in claim 22, wherein said transesterification product includes a donor content of about 4–6 weight percent.

26. A catalyst composition as defined in claim 23, wherein said transesterification product includes a donor content of about 4–6 weight percent.

27. A catalyst composition as defined in claim 1, wherein said magnesium content of said transesterification product is up to about 22 weight percent.

28. A catalyst composition as defined in claim 25, wherein said magnesium content of said transesterification product is up to about 22 weight percent.

29. A catalyst composition as defined in claim 26, wherein said magnesium content of said transesterification product is up to about 22 weight percent.

30. A catalyst composition as defined in claim 1, including the step of:

(d) washing said transesterification product.

31. A catalyst composition as defined in claim 28, including the step of:

(d) washing said transesterification product.

32. A catalyst composition as defined in claim 29, including the step of:

(d) washing said transesterification product.

33. A catalyst composition as defined in claim 30, including the step of:

(e) reacting said transesterification product with $TiCl_4$.

34. A catalyst composition as defined in claim 31, including the step of:

(e) reacting said transesterification product with $TiCl_4$.

35. A catalyst composition as defined in claim 32, including the step of:

(e) reacting said transesterification product with $TiCl_4$.

36. A catalyst composition as defined in claim 6, wherein said organic titanium compound is an organic titanium halide.

* * * * *